United States Patent [19]

Adams et al.

[11] Patent Number: 5,151,286

[45] Date of Patent: Sep. 29, 1992

[54] PROCESS FOR PACKAGING ACIDIFIED VEGETABLE

[75] Inventors: James Adams, Hartland; Frank J. Meczkowski, Farmington Hills, both of Mich.

[73] Assignee: Campbell Soup Company, Camden, N.J.

[21] Appl. No.: 675,164

[22] Filed: Mar. 26, 1991

Related U.S. Application Data

[63] Continuation-in-part of Ser. No. 494,214, Mar. 15, 1990, abandoned.

[51] Int. Cl.$^5$ .................................................. A23B 7/10
[52] U.S. Cl. ..................................... 426/324; 426/268; 426/270; 426/326; 426/615
[58] Field of Search ............... 426/270, 262, 268, 324, 426/321, 615, 326

[56] References Cited

U.S. PATENT DOCUMENTS

| | | | |
|---|---|---|---|
| 2,676,889 | 4/1954 | Keenan | 426/268 |
| 3,578,466 | 5/1971 | Luckmann | 426/325 |
| 3,795,749 | 3/1974 | Cummin et al. | 426/326 |
| 3,987,208 | 10/1976 | Rahman et al. | 426/326 |
| 4,006,257 | 2/1977 | Kolk | 426/321 |
| 4,011,348 | 3/1977 | Farrier et al. | 426/270 |
| 4,224,347 | 9/1980 | Woodruff | 426/270 |
| 4,711,789 | 12/1987 | Orr et al. | 426/324 |
| 4,789,553 | 12/1988 | McIntyre et al. | 426/321 |
| 4,867,996 | 9/1989 | Tyman | 426/326 |
| 4,883,674 | 11/1989 | Fan | 426/324 |
| 4,883,679 | 11/1989 | Sewon | 426/321 |
| 4,895,729 | 1/1990 | Powrie et al. | 426/324 |
| 4,931,297 | 6/1990 | Malyniak et al. | 426/268 |
| 4,943,440 | 7/1990 | Armstrong | 426/324 |

FOREIGN PATENT DOCUMENTS

| | | | |
|---|---|---|---|
| 0270764 | 6/1988 | European Pat. Off. | 426/324 |
| 2712551 | 9/1978 | Fed. Rep. of Germany | 426/268 |
| 3624035 | 2/1987 | Fed. Rep. of Germany | 426/321 |
| 2582484 | 12/1986 | France | 426/324 |
| 2589330 | 5/1987 | France | 426/324 |
| 55-118344 | 9/1980 | Japan | 426/270 |
| 58-67143 | 4/1983 | Japan | 426/325 |
| 58-67144 | 4/1983 | Japan | 426/325 |
| 59-88041 | 5/1984 | Japan | 426/321 |
| 60-214836 | 10/1985 | Japan | 426/325 |
| 62-65638 | 3/1987 | Japan | 426/324 |
| 63-22138 | 1/1988 | Japan | 426/321 |
| 63-181945 | 7/1988 | Japan | 426/324 |

OTHER PUBLICATIONS

Food Engineering Oct. 1986 p. 83 Plus.

Primary Examiner—Steven Weinstein
Attorney, Agent, or Firm—Banner, Birch, McKie & Beckett

[57] ABSTRACT

A process for packaging acidified vegetables without a covering brine includes sealing the brineless vegetables in an opaque package.

Central to the invention is a quick equalization brine treatment which is used to reduce the respiration rate of fresh vegetables and reduce their pH to less than about 4.5 in less than about 6 hours.

7 Claims, No Drawings

PROCESS FOR PACKAGING ACIDIFIED VEGETABLE

This application is a continuation in part of copending application Ser. No. 494,214 filed on Mar. 15, 1990, now abandoned, which is herein incorporated by reference.

FIELD OF THE INVENTION

The invention relates to acidified vegetables exhibiting a fresh deli-type pickle taste, and a texture and appearance of the fresh vegetable. The invention also relates to a process for the preparation and packaging of such vegetables.

DESCRIPTION OF RELATED TECHNOLOGY

Fresh vegetables require high respiration levels to maintain their fresh color, taste, and texture. Unfortunately, fresh vegetables can be stored for less than only about a week before the vegetable starts to exhibit degradation and increasingly rancid flavors. Accordingly, the art has developed a variety of techniques for treating the vegetables so they can be stored for longer periods of time.

The three basic type of pickled vegetable treatments result in vegetables known as fermented, refrigerated, and pasteurized. Fermenting vegetables involves continuous contact of the fresh vegetable with a brine consisting essentially of water and about 10% salt for several weeks, and one or more flavoring agents. The once-fresh vegetable is fermented into a pickled vegetable which, after fermentation, has no discernible respiration. This pickled vegetable chemically becomes changed both in flavor and appearance from the original vegetable as natural sugars are changed into lactic acid. The flavor of the pickled vegetable is more closely akin to that of the brine than the fresh vegetable, and the apperance is much darker than the original vegetable. The fresh vegetable appearance cannot be recovered.

After the pickled vegetables are separated from the salt brine, they are covered with a finishing brine containing water, flavoring agents, and vinegar. Extended contact with the finishing brine permits the flavoring agents to infuse the vegetable and protects the vegetable from oxidation. The finishing brine, however, does not further ferment the vegetable.

When pickling is applied to cucumbers, the natural bright green color of the vegetable is changed during the fermentation process to an olive green or a yellow-green. Very little if any of the native cucumber taste or texture remains when the fermentation is complete. See, "Equilibration of Solutes in Nonfermenting, Brined Pickling Cucumbers", *J. Food Science*, v. 51, no. 2, pp. 434-439 (1986); Fleming et al, "Storage Stability of Vegetables Fermented with Ph Control", North Carolina Agricultural Research Service, Raleigh, NC; and Etchells et al., "Suggested Procedure for the Controlled Fermentation of Commercially Brined Pickling Cucumbers-The Use of Starter Cultures and Reduction of Carbon Dioxide Accumulation", *Pickle Pak Science*, v. 3, pp. 4-14 (1973).

Packaged vegetables that are to be stored under refrigeration have been equilibrated with a salty, acidic brine under relatively cool conditions, e.g., about 38°-40° F. The cool contacting conditions and cool storage requirement help to preserve more of the fresh vegetable color than traditional fermentation processes, but the flavor of the treated vegetable is changed from that of the fresh vegetable.

Overnight dills are one example of a refrigerated cucumber product that has undergone refrigerated treatment and retains the desired fresh vegetable color for several weeks. The dill product, however, changes to a yellowish-straw color after that time. A study of refrigerated cucumbers is set forth in Etchells et al., "Advisory Statement on Overnight Dills—Part I", published by Pickle Packers Intnl., Inc., St. Charles, Ill. Like the fermented vegetables, a finishing brine covers and protects the dill from oxidation by air in the package while permitting flavoring agents to infuse the vegetable.

Pasteurized vegetables are acidified, equilibrated vegetables that have been heated sufficiently to kill most of the yeast, acid-forming bacteria, and other microorganisms that would cause the vegetable to spoil upon storage. Pasteurization in the context of pickles is described in "The Pasteurization of Pickles", *The Glass Packer*, February (1957). For pickles, typical pasteurization conditions are to a core temperature of about 160°-175° F. for about 10-30 minutes. Care should be taken to avoid overheating since overheating affects the crispness and flavor of the pickle.

It should be noted that conventional, fully fermented pickles and refrigerated pickles do not require pasteurization. All other pickles and pickle products, however, require some form of heat processing, e.g., pasteurization, for preservation during storage.

Like the other processes, a finishing brine covers and protects the pasteurized vegetable from oxidation while in the package. This brine affects the vegetable during storage and changes its flavor, texture, and appearance. It would be desirable to have a means for retaining as much as possible of the fresh vegetable's original flavor, taste, and texture.

In addition to the characteristics noted above, the processes of fermentation, refrigeration, and pasteurization require several days for the subject vegetable to achieve an equilibrium with the brine. Such extended treatment times limit the production rate of a facility having space limitations for treatment containers. If the processing time for producing packaged fresh vegetable products could be reduced to a matter of hours rather than days, the productivity rate of existing facilities would be greatly enhanced.

The prior art processing methods have heretofore required the use of a covering layer of brine in a relatively large container. The brine, however, is an environmentally problematic fluid both from the standpoints of discarding the brine used in the process and for discarding the brine after the vegetable is consumed. Conventional processing brines cannot be reused in treatment process due to the chemical changes in the brine caused by equilibration with the vegetable. Such used brine must be disposed of with a high degree of care.

Consumers of brine-containing vegetables have a similarly difficult time. Metal trash cans may not be lined so they corrode after contact with the discarded acidic brine and dumping salt-containing, acidic brine on the ground is not an environmentally acceptable disposal method. The salt and acid in the brine can harm living plants. As a result, it would be desirable to have a vegetable product that could be stored for extended periods of time without a covering layer of brine.

It would be useful to have a process and package for fresh vegetables that did not require a covering brine but which would result in a packaged vegetable that could be stored for extended periods of time without adversely affecting the flavor, color, or texture of the vegetable.

SUMMARY OF THE INVENTION

It is an object of the invention to provide an acidfied vegetable that retains a fresh deli-type taste, and a color and texture of the fresh vegetable for extended periods of time.

It is an object of the invention to reduce the time required for processing fresh vegetables into packaged foods.

It is also an object of the invention to provide an acidified vegetable that does not require a covering brine for storage.

In accordance with the objects above and others that will become apparent from the description herein, one aspect of the invention relates to a process for preparing acidified vegetables exhibiting a fresh deli-type pickle flavor, said process comprising:

contacting at least one fresh vegetable with a quick equalization brine for less than about 4 hours to produce at least one acidified vegetable having a pH of less than about 4.5 and which exhibits a fresh deli-type flavor, said brine comprising salt in an amount within the range from about 4% to about 12% and either acetic acid or phosphoric acid;

separating said at least one acidified vegetable from said brine;

transferring said at least one acidified vegetable to an opaque, sealable package; and sealing said at least one acidified vegetable in said package in the absence of a covering brine.

The invention also encompasses the products produced by this process.

The present invention provides packaged, acidified, vegetables that exhibit a fresh deli-type taste with the color and texture of the fresh vegetable but which have extended storage periods. The present invention does not need a brine to cover the treated fresh vegetable thereby eliminating the concerns associated with brine disposal by the consumer. As an added benefit, the quick equalization brine is not changed like a fermentation brine so the brine can be refreshed and recycled for reuse. Recycle of the treating brine substantially reduces the environmental concerns associated with a process using a salty, acidic brine.

DETAILED DESCRIPTION

The present invention relates to the discovery that the respiration rate of fresh vegetables can be dramatically reduced but not eliminated by contacting the vegetables for a short period with a concentrated equalization brine and then storing the contacted vegetables in an opaque container, i.e., a container that does not transmit light to the contained vegetables. The brine quickly reduces the pH of the fresh vegetables to less than about 4.5 in less than about 6 hours usually less than about 4 hours, and preferably in about 1 to about 3 hours at room temperatures of about 65° to about 80° F. Particularly preferred contacting temperatures for most vegetables are at about 70° to about 75° F. for about 2 hours. Vegetables that have a relatively dense outer surface or overall structure, however, may require extended contact to achieve a pH of less than about 4.5. Relatively open vegetables may require less contact time.

The quick equalization brine comprises relatively high levels of acid and salt compared to a conventional pickling brine for the same vegetable. Generally, the equalization brine has above about 1% of acetic and above about 0.2% of phosphoric acid and above about 3 wt % salt. (For purposes of salt concentration calculations, the brine is presumed to have a specific gravity of 1.0.) Preferably, the quick equalization brine according to the invention has about 1% to about 3% of acetic acid or a mixture of acetic acid and about 0.25% to about 0.5% phosphoric acid, and salt in an amount within the range from about 4% to about 12%.

The acid and salt concentrations in the actual brine used according to the invention should be adjusted to correspond to the diffusivity of the vegetable and the vegetable form. Such adjustments are well within the existing skill levels from the description and examples contained herein. For cucumbers in the form of spears or chips, brines can have about 1.8 to about 2.5% of the acid and about 4 to about 12% salt. Relatively open vegetables like carrots and celery use a less salty brine, e.g., about 4-8% salt, but with higher levels of acid. Preferred acid concentrations are about 2.5 to about 4% acid and about 5 to about 7% salt.

Vinegar is typically used as the source of acetic acid in the brine. If a less sharp flavor is desired, the amount of vinegar used may be reduced and/or replaced at least in part with food grade phosphoric acid (85%). Suitable phosphoric acid concentration is up to about 1 wt % based on the entire brine weight, preferably about 0.2 to about 0.5 wt % phosphoric acid.

The brine can also include a variety of conventional flavoring, preservative, and/or crisping agents. Suitable flavoring agents that can be used in the brine include emulsions for dill, deli, kosher, and sweet flavorings such as bread and butter chip flavors. A preferred preservative is sodium benzoate.

As mentioned above, relatively dense vegetables like cauliflower florets that may need extended treatment to become acidic. As an example, cauliflower florets are preferably treated in a first brine having about 5 to about 7% acid and about 4 to about 7% salt for about 2 hours and a second brine that is less acidic having about 2.5 to about 4% acid for another two hours. The salt can remain about the same for each brine with a contact period of about 1.5 to about 3 hours for each step. Such a sequence is particularly useful when cauliflower is mixed with other vegetables because the cauliflower can be processed in a parallel system. Pretreated cauliflower can be combined with the fresh vegetables and equalized as a mixture.

After equalization, the acidified vegetable is then separated from the brine and placed brineless into an opaque container. While not wishing to be bound by theory, it appears that the transmission of light into the container reacts with unsaturated fatty acids in the treated vegetable to form hydroperoxides. These hydroperoxides seem to decompose under the effects of light and produce unpleasant flavors. Eliminating contact with light thereby avoids the formation of unpleasant flavors in the stored product.

Materials that are sufficiently opaque according to the invention include opaque plastics such a colored polyolefin (like polypropylene or polyethylene), nylon, or nylon/polyolefin laminates, polyesters; vinylidene chloride; and metal foil composites with virtually any plastic material that can be formed by heat, pressure, or casting into a container; or pigment-coated nonopaque containers.

Indeed, it has been found that virtually any acidified vegetable can be packaged for extended periods of time in the absence of a covering brine than previously thought to be possible if the packaging materials are opaque. The opaque container appears to be responsible for blocking the transmission of light which would otherwise catalyze the oxidation of any fatty acids present in the vegetable. The result is a more economic package due to the reduced weight of the contained vegetable and the absence of a salty brine that would otherwise have to be discarded with potentially hazardous environmental consequences.

In the container and surrounding the exposed vegetable, the atmosphere may or may not be modified. In copending application Ser. No. 494,214 (now abandoned), it is taught that vegetables treated in a quick brine equalization process should be stored in a container having about 1–1.5% oxygen and less than about 5% carbon dioxide in the container atmosphere. While such atmosphere treatments are certainly operable, it has now been determined that they are not required when packaging fresh vegetable treated with the present quick brine equalization process and stored in an opaque container. The vegetable will not spoil, and any flavor variations are slight and can be accommodated by changes in the flavor emulsion and/or acid source in the brine.

The container atmosphere according to the present invention may have more than 1.5% oxygen up to the ambient oxygen concentration of about 20%. Preferably, the atmosphere in the container has an oxygen content equal to the ambient oxygen concentration and a carbon dioxide concentration also equal to ambient air. Such a change in the process described in copending application Ser. No. 494,214 results in substantial cost savings.

Like the method of the patent application identified above, the container holding the treated fresh vegetable is hermetically sealed by any physical, chemical, or mechanical method. A preferred container material exhibits at least a medium level of overall gas diffusion inhibition. As used herein, a medium level of gas diffusion means less than about 8 to about 3 cc $O_2$ diffused per 100 in$^2$ in a 24 hour period at standard one atmosphere conditions. Materials having high barrier properties permit about 0.05 to less than about 3 and preferably about 0.05 to about 1.5 cc $O_2$/100 in$^2$ per 24 hours. The overall diffusion rate may also be a composite of weighted diffusion rates for the various parts of the container, e.g. a high barrier lower compartment over the bottom and sides of the complete container with a lid having a medium barrier material. It is to be understood that while medium and high barrier materials are preferred, the particular degree of oxygen diffusion and permissible respiration rates will depend on the particular vegetable. No more than routine experimentation will indicate which level of barrier should be used for a particular vegetable treated in accordance with the invention. Aluminum foil, wax coated papers, high barrier plastics (such as a nylon, at least one polyolefin, a polyester, or vinylidene chloride), polymerized alcohols (e.g., ethylvinyl alcohol) and laminates thereof are examples of suitable container and lidding materials as long as they inherently or with modification exhibit the opacity characteristics noted above.

Preferably, the lid and lower compartment are made of materials that are thermally compatible so the lid and compartment can be closed by thermal welding. Most preferably, the thermal bond is sufficient to form a hermetic seal yet sufficiently weak so the package can be opened by peeling one part from the other along the weld lines.

Virtually any fresh fruit, vegetable, or gourd can be treated by the present invention. Examples of suitable fresh vegetables include the root-based or leguminous vegetables (e.g., carrots) and above-ground vegetables such as stem-based vegetables (e.g., celery), flower-based vegetables (e.g., broccoli and cauliflower), preacidified versions of these vegetables, preacidified fruits or vegetables (e.g., olives and pepperoncini), and mixtures thereof. Gourd portions that can be treated in accordance with the invention include portioned cucumbers, melons, squash, and pumpkins. Cucumbers in the form of spears or chips benefit particularly from the present invention. As used herein, references to "vegetable" are intended to include fruits, conventionally identified vegetables, gourds or portions of any of them either alone or in combination. In most cases, conventional portion sizes will be used of a shape sufficient to permit a level of acidification through mass transfer within the time frames disclosed herein. Examples of such portions are cucumber chips and spears of conventional dimensions.

The present invention is particularly useful for commercial operations because the quick equalization brine used to acidify the vegetable and can be recycled completely. Because the brine does not involve microbial fermentation of natural vegetable sugars to lactic acid, the brine can be reused with only minor refreshing. Appropriate analysis, such as with a spectrophotometer, will indicate the used brine composition and which brine components should be added to refresh the brine to its initial concentrations. Such flexibility reduces the cost of the processing and also eliminates hazards to the environment by brine discharge.

The following examples will serve to illustrate the invention.

EXAMPLE 1

Modified Atmosphere

Cucumber spears were contacted with quick equalization brine SP at equal volumes for 2 hours and transferred to a sealable container. The container was flushed with nitrogen until an oxygen sensor indicated an oxygen concentration of 1.25% oxygen. The spears were stored at 40° F. and tested for flavor and color at certain intervals. The spears retained their fresh flavor and color about 74 days.

The ingredient weights for a one gallon volume of brine SP are listed in Table 1. Larger quantities can be made by increasing the concentration of each component in proportion to those set forth. Salt concentration is based on a presumed specific gravity for the brine of 1 g/ml.

TABLE 1

| Brine SP | |
|---|---|
| 9.12 grams | Sodium Benzoate (as a preservative) |
| 613.00 ml | 120 Grain Vinegar |
| 416.00 grams | Granulated Salt |
| 3,154.00 ml | Water |
| 3.08 grams | Flavor Emulsion |
| Chemistry Specification: | 2.0 wt % acetic acid |

TABLE 1-continued

| Brine SP | |
|---|---|
| 11.0 wt % (wt) salt | |

After refrigeration for 2 weeks at 40° F., a panel of 12 individuals tasted the cucumber spears of example 1 relative to commerically available, refrigerated, deli dills in a glass jar with a covering brine. Standard A was the commericial dill that was kept in an unopened jar until just before the tests. Standard B was also a commercial dill but was opened 1½ hours before the tests.

The comments about the cucumber spears of example 1 relative to the standards A and B were:

Appearance: white color; not cured

Taste: freshest taste; tastes like a raw cucumber; less garlic flavor; no garlic taste but fresher; acidified slightly stale fresh pack; flavor not as pronounced; lack spice, color, and flavor of a deli dill;

Texture: crunchiest; firmest texture; no salt absorbed with a different flavor profile; lower flavor level; lower salt level; a nice product.

EXAMPLE 2

Modified Atmosphere

Cucumber chips were contacted with quick equalization brine CHP at equal volumes for 2 hours and transferred to a sealable container. The container was flushed with nitrogen until an oxygen sensor indicated an oxygen concentration of 1.25% oxygen. The spears were stored at 40° F. and tested for flavor and color at certain intervals. The chips retained their fresh flavor and color about 74 days.

As in example 1, the ratios for a one gallon volume of brine CHP are listed in Table 3.

TABLE 3

| Brine CHP | |
|---|---|
| 9.12 grams | Sodium Benzoate (as a preservative) |
| 613.00 ml. | 120 Grain Vinegar |
| 302.40 grams | Granulated Salt |
| 3,154.00 ml | Water |
| 3.08 grams | Flavor Emulsion |
| Chemistry Specification: | 2.0 wt % Acetic acid |
| | 8.0 wt % Salt |

EXAMPLE 3

Modified Atmosphere

A mixture of carrots, cauliflower, celery, and cucumbers were treated according to the invention. Because cauliflower is a dense, relatively impermeable vegetable, fresh cauliflower florets were pretreated by soaking the florets for 2 hours in brine CAU at equal weights of cauliflower and brine. The ingredient list for making 1 gallon of brine CAU is listed in Table 5. Like any of the present brines exemplified, larger quantities of brine can be made by increasing the ingredient proportions in accordance with the weight ratios exemplified.

TABLE 5

| Brine CAU | |
|---|---|
| 9.12 g | Sodium Benzoate |
| 1,892.00 ml | 120 Grain Vinegar |
| 226.80 g | Granulated Salt |
| 1,1893.00 ml | Water |
| Chemistry Specification: | 6.0 wt % acetic acid |

TABLE 5-continued

| Brine CAU | |
|---|---|
| 6.0 wt % Salt | |

The pretreated cauliflower florets were then mixed with the remaining fresh pieces and equalized in brine MX. The mixture was packaged into several identical containers at a packing ratio of 48 wt % solids and 52 wt % brine. The ingredient proportions for 1 gallon of brine MX is listed in Table 6.

TABLE 6

| Brine MX | |
|---|---|
| 9.12 g | Sodium Benzoate |
| 946.00 ml | 120 Grain Vinegar |
| 226.80 g | Granulated Salt |
| 2,839.00 ml | Water |
| Chemistry Specification: | 3.0 wt % Acetic acid |
| | 6.0 wt % Salt |

Preacidified pepperoncini and olives were added to the mixture of quickly equalized fresh vegetables. The preacidified vegetables retained their original flavors after extended storage and did not appear to affect the storage characteristics of the quickly equalized vegetables. The vegetable mix was in the following proportions:

| Vegetables: | | |
|---|---|---|
| Pretreated cauliflower florets | | 163.0 g |
| Fresh cut 0.25" sliced cucumbers | | 358.8 g |
| Fresh cut 0.25" sliced carrots | | 228.3 g |
| Fresh cut 0.25" sliced celery | | 53.6 g |
| Pepperoncini (*) | | 121.8 g |
| Stuffed olives (*) | | 64.7 g |
| | Total | 990.2 g |
| Brine MX | | 1090.2 g |

(*) Preacidified vegetable

After soaking for 2 hours, the vegetables had the following pH values:

| | As Equalized | |
|---|---|---|
| Vegetable | | pH |
| cauliflower | | 3.98 stem |
| | | 3.68 flower |
| cucumber | | 3.68 |
| carrot | | 3.46 |
| celery | | 3.32 |
| olive (*) | | 3.32 |
| pepperoncini (*) | | 3.09 |

(*) Preacidified vegetable

The vegetable mixture was packed into a high barrier container and flushed with nitrogen to 1.25% oxygen. The container was then sealed and stored at 40° F. After 3 days of refrigerated storage, one of the sample containers was opened and the vegetables tested for pH and taste. The vegetables were rinsed with distilled water to remove surface acidity. Each vegetable had the following Ph values at the center:

| | After 3 Days | |
|---|---|---|
| Vegetable | | pH |
| cauliflower | | 3.76 |
| cucumber | | 3.46 |
| carrot | | 3.79 |

-continued

| After 3 Days | |
|---|---|
| Vegetable | pH |
| celery | 3.78 |
| olive (*) | 3.35 |
| pepperoncini (*) | 3.14 |

(*) Preacidified vegetable

The taste test involved 5 individuals. Each tester found the vegetables to be crisp with a texture equivalent to the fresh vegetable. The brine imparted the taste of a light vinegarette acidity.

After 17 days, another sample container of the mixture was opened and tested for pH. The test procedure was the same as for the 3 day test. Each vegetable had the following values in their centers:

| After 17 Days | |
|---|---|
| Vegetable | pH |
| cauliflower | 3.85 |
| cucumber | 3.58 |
| carrot | 3.63 |
| celery | 3.58 |
| olive (*) | 3.68 |
| pepperoncini (*) | 3.22 |

(*) Preacidified vegetable

EXAMPLE 4

Modified v. Unmodified Atmosphere

Two samples of fresh cucumber spears were quickly acidified in brine according to the invention (3.0 wt % acid and 11.0% salt) and then packed into high barrier containers without a covering brine. Package type A was flushed with nitrogen to reduce the oxygen content of the package atmosphere to about 1.5% oxygen. Package type B was packaged with an ambient atmosphere, i.e. about 20% oxygen. Within each sample type, two flavor formulations, 1 and 2, were prepared for parallel testing to determine how the flavoring concentration would affect the taste perception of the cucumber. Formulation 2 contained a 25% higher flavoring concentration than the standard flavoring formulation 1. The tested samples are referred to herein as A1, A2, B1, and B2.

The samples were stored at 40° F. for 18 days and then tasted. The sample cucumbers had a "very crisp" texture and an appearance similar to a Deli pickle, i.e., a bright white color with the appearance of fresh cucumber. While all the samples had good, acceptable flavors, the B type packages (ambient air) were perceived as not being as "tart" as the A type (controlled oxygen content) packages. Sample B1 (ambient air, standard formulation) was preferred over B2 due to an "off" taste in the B2 sample. It is not presently known why the more concentrated flavor formulation would produce an "off" taste.

EXAMPLE 5

Unmodified Atmosphere

Fresh cucumber spears were quickly acidified by contacting the spears until the spears reached a pH of 4.05. This acidification took about 70 minutes in the following equalization brine whose proportions to make a 1 gallon volume of brine are listed in Table 7.

TABLE 7

| 13.7 g | Sodium Benzoate |
| 300.4 ml | 120 Grain Vinegar |
| 10.0 ml | Phosphoric acid (food grade) |
| 400.0 g | Granulated Salt |
| 3209.9 ml | Water |
| 6.24 g | Flavor emulsion |

For comparison, identical samples were acidified in the brine listed in Table 7 but without the phosphoric acid.

After the acidification, the spear samples were packed without covering brine into a high barrier packaging material under ambient atmosphere packaging conditions, i.e., the package atmosphere was unmodified.

The samples were stored for 9 days at 40° F. and then tasted. The phosphoric acid-containing samples were perceived as "less acidic", "very good", having "too much garlic" (although the flavor emulsions were the same), and "very crunchy". The cucumber pH was 3.30.

This example shows that packaged fresh vegetables need not use a covering brine or a modified package atmosphere to result in a storable fresh vegetable product that will not spoil upon storage.

EXAMPLE 6

Effect of Light Transmission

In this example, 4 different films of different light transmission values were evaluated for their effect on storage stability of cucumbers prepared in accordance with the invention. Each film measured $5\frac{1}{2}'' \times 5\frac{1}{2}''$ and were placed on the top and bottom of a 4-compartment container. The sides of the containers were clear.

The four film materials were:

A: a white translucent polyester film having a light transmission value of 31.62% white light and 0.229% ultraviolet light.
B: a yellow translucent polyester film having a light transmission value of 31.62% white light and 0.229% ultraviolet light.
C: a metallized polyester film having a light transmission of 1.585% white light and 2.455% ultraviolet light.
D: a photograde, foil-coated, polyester film having a light transmission of less than 0.14% for white light and less than 0.14% for ultraviolet light.

The cucumber products were stored under fluorescent lighting and sampled for taste, appearance, and color at 24 hours. Only sample D using the foil-coated polyester film was considered acceptable. With additional time, however, even the sample D materials started to degrade. It is theorized that even the small amount of reflected light entering the package was sufficient to start the photodecomposition of the contained cucumber products.

EXAMPLE 7

The packaging of example 6 was modified to use pouches of the sample materials into which clear 4-pack containers bearing the cucumber samples were placed. The pouches were then closed and held shut with adhesive tape. As in example 6, only the foil-coated film blocked enough light to avoid photodecomposition of the stored product, but sample D did not exhibit decomposition after 24 hours. The improvement in Sample D between examples 6 and 7 is attributed to the elimination of light leaks around the package.

It will be understood that the examples presented above are merely for illustration. The specific materials, ratios, and concentrations are not intended to act as limitations on the scope of the appended claims.

We claim:

1. A process for packaging an acidified vegetable exhibiting a fresh deli-type flavor, said process consisting essentially of the steps of:

contacting a fresh vegetable with a quick equalization brine for less than about 4 hours to produce an acidified vegetable having a pH of less than about 4.5 and which exhibits a fresh deli-type flavor, said brine comprising salt in an amount within the range from about 4% to about 12% and either acetic acid or a mixture of acetic acid and phosphoric acid;

separating said acidified vegetable from said brine;

transferring said acidified vegetable to a sealable package that is opaque to the transmission of light through said package; and sealing said acidified vegetable in said package having oxygen and carbon dioxide concentrations in the package atmosphere equal to that of ambient air but in the absence of a covering brine.

2. A process according to claim 1 further comprising:

storing the sealed package at a temperature of about 35° to about 45° F.

3. A process according to claim 1 wherein said fresh vegetable comprises carrots, cauliflower, celery, cucumbers, or mixtures thereof and wherein the contacting step comprises:

contacting said fresh vegetable with a quick equalization brine comprising about 2.5% to about 4% of either acetic or a mixture of acetic acid and phosphoric acid and about 5% to about 7% salt.

4. A process according to claim 1 wherein the contacting step comprises:

contacting said vegetable with a quick equalization brine comprising above about 1.5% of acetic acid.

5. A process according to claim 1 further comprising:

recycling the separated brine for reuse in the contacting step.

6. A process according to claim 5 further comprising:

analyzing the separated brine for composition;

adding brine components sufficient to refresh said brine; and reusing the refreshed brine in said contacting step.

7. A process according to claim 1 further comprising:

mixing at least one preacidified fruit with said acidified vegetable before the transferring step.

* * * * *